(12) United States Patent
Kamijima

(10) Patent No.: US 6,226,147 B1
(45) Date of Patent: May 1, 2001

(54) THIN-FILM MAGNETIC HEAD PROVIDED WITH LONGITUDINAL COIL CONDUCTOR GROOVES

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/362,567

(22) Filed: Jul. 28, 1999

(30) Foreign Application Priority Data

Jul. 30, 1998 (JP) .................................................. 10-228530

(51) Int. Cl.[7] ........................................................ G11B 5/17
(52) U.S. Cl. ............................................................ 360/123
(58) Field of Search ..................................... 360/123, 126

(56) References Cited

U.S. PATENT DOCUMENTS

| | | | |
|---|---|---|---|
| 4,684,438 | * 8/1987 | Lazzari | 156/649 |
| 5,059,278 | * 10/1991 | Cohen et al. | 156/643 |
| 5,065,270 | * 11/1991 | Koyanagi et al. | 360/123 |
| 5,734,534 | * 3/1998 | Yamamoto et al. | 360/123 |
| 6,066,246 | * 5/2000 | Richards et al. | 205/123 |

FOREIGN PATENT DOCUMENTS 51-148414 * 12/1976 (JP) .

* cited by examiner

Primary Examiner—Jefferson Evans
(74) Attorney, Agent, or Firm—Arent Fox Kintner Plotkin Kahn PLLC.

(57) ABSTRACT

A thin-film magnetic head includes a thin-film magnetic circuit that contains a coil conductor with at least one surface. The coil conductor includes a plurality of grooves for reducing electrical resistance of the coil conductor due to skin effect. The grooves are formed on the at least one surface of the coil conductor to run along axis of the coil conductor.

5 Claims, 2 Drawing Sheets

THIN-FILM MAGNETIC HEAD PROVIDED WITH LONGITUDINAL COIL CONDUCTOR GROOVES

FIELD OF THE INVENTION

The present invention relates to a thin-film magnetic head with an inductive transducer element for magnetically recording information into a magnetic medium such as a hard disk or a floppy disk, and to a manufacturing method of the thin-film magnetic head.

DESCRIPTION OF THE RELATED ART

Two thin-film magnetic pole layers and a thin-film coil conductor basically constitute an inductive transducer element of such thin-film magnetic head. ABS (Air Bearing Surface) side ends of the respective magnetic pole layers are opposed with each other via a magnetic gap layer and rear portions of the magnetic pole layers are in contact with each other to form a magnetic yoke. The coil conductor is wound around the yoke.

The conventional coil conductors used in such inductive transducer element have been fabricated to have a smooth profile of straight line parts or of straight line parts and partially curved parts in cross section as shown in FIG. 1.

In case that the coil conductor has such smooth surface, the higher frequency range of the write current, the larger resistance value of the coil conductor due to the skin effect. Larger resistance value of the coil conductor causes not only high heating value and high power consumption but also difficulty in designing and in fabricating a head amplifier. Recently, the write current frequency of the thin-film magnetic head has been requested to more heighten in order to realize higher density magnetic recording. Thus, increase of the resistance value of the coil conductor due to the skin effect has become serious problem.

SUMMARY OF THE INVENTION

It is therefore an object of the present invention to provide a thin-film magnetic head and a manufacturing method of the head that can adapt to high-density recording and has a coil conductor with a lower electrical resistance.

Another object of the present invention is to provide a manufacturing method of a thin-film magnetic head that can form a coil conductor with a lower electrical resistance without introducing any additional process.

According to the present invention, a thin-film magnetic head includes a thin-film magnetic circuit that contains a coil conductor with at least one surface. The coil conductor includes a plurality of grooves for reducing electrical resistance of the coil conductor due to skin effect. The grooves are formed on the at least one surface of the coil conductor to run along axis of the coil conductor.

Since a plurality of grooves for reducing electrical resistance of the coil conductor due to skin effect are formed on the surface of the coil conductor to run along axis of the coil conductor, namely along the direction of write current flowing, increasing in resistance due to the skin effect can be suppressed even if the write current frequency more heightens. As a result, the magnetic head can be prevented from heating and high power consumption. In addition, thanks to very low resistance value of the coil conductor, design and fabrication of a head amplifier become very easy.

It is preferred that the coil conductor has side faces, and that the plurality of grooves for reducing electrical resistance due to the skin effect are formed on the side faces.

It is also preferred that the plurality of grooves for reducing electrical resistance due to the skin effect are many grooves with many projections and depressions.

The plurality of grooves for reducing electrical resistance due to the skin effect may have pitches of about 0.05–0.2 $\mu$m, and/or may have a depth of about 0.01–0.1 $\mu$m.

According to the present invention, furthermore, a manufacturing method of a thin-film magnetic head with a thin-film magnetic circuit which contains a coil conductor, includes a step of forming a resist layer, a step of exposing the formed resist layer by applying a monochromatic light via a mask with a predetermined pattern, a step of developing the exposed resist layer without performing a post exposure baking (PEB) process, and a step of plating the coil conductor by using the developed resist layer.

Also, a manufacturing method of a thin-film magnetic head according to the present invention has a step of forming a lower magnetic pole layer, a step of depositing a magnetic gap layer on the lower magnetic pole layer, a step of forming a coil conductor with at least one surface above the magnetic gap layer, and a step of forming an upper magnetic pole layer above the magnetic gap layer. The coil conductor forming step includes a step of forming a low resistance layer on the magnetic gap layer, a step of forming a resist layer on the low resistance layer, a step of exposing the formed resist layer by applying a monochromatic light via a mask with a predetermined pattern, a step of developing the exposed resist layer without performing a post exposure baking (PEB) process, a step of plating the coil conductor by using the developed resist layer, and a step of, thereafter, removing the resist layer.

The resist layer is exposed by a monochrome light and then developed without performing the PEB process. Thus, a plurality of grooves with many projections and depressions are formed on inner walls of resist trenches of the resist layer. Then, by executing frame plating using the resist layer, the coil conductor is formed with both side faces having the many grooves with many projections and depressions along its axis. Since no PEB process is needed, a more simple manufacturing process can provide the coil conductor with a lower resistance.

It is preferred that the exposing step includes a step of exposing the formed resist layer by applying a monochromatic light via a mask with a predetermined pattern to make resist trenches with a plurality of grooves on inner walls of the resist trenches.

It is also preferred that the plurality of grooves are many grooves with many projections and depressions The plurality of grooves may have pitches of about 0.05–0.2 $\mu$m, and/or may have a depth of about 0.01–0.1 $\mu$m.

Further objects and advantages of the present invention will be apparent from the following description of the preferred embodiments of the invention as illustrated in the accompanying drawings.

DESCRIPTION OF THE PREFERRED EMBODIMENTS

Figure 1:
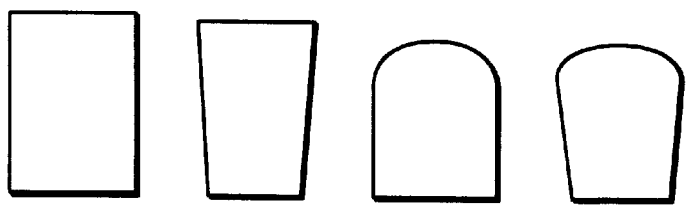
FIG. 1 schematically illustrates sections of various examples of the coil conductors of the conventional inductive transducer elements.
Figure 2:
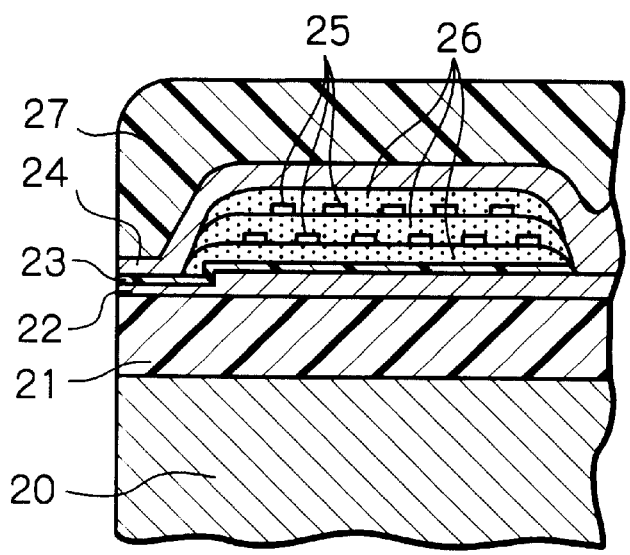
FIG. 2 is a sectional view schematically illustrating a part of a thin-film magnetic head as a preferred embodiment according to the present invention.
Figure 3:
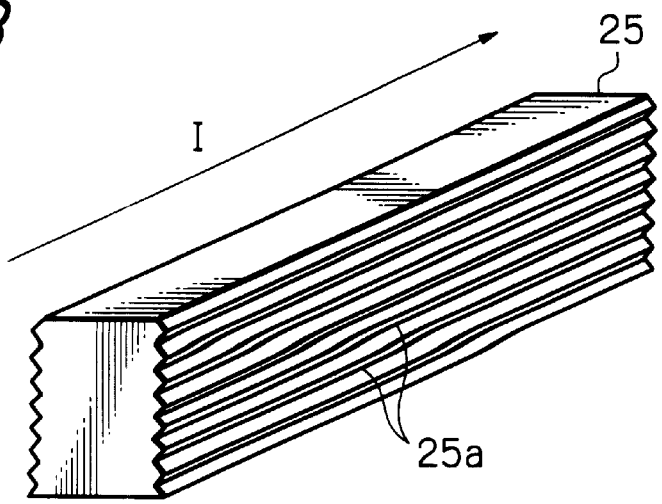
FIG. 3 is an oblique view schematically illustrating a partial shape of a coil conductor in the embodiment shown in FIG. 2.

FIG. 2 schematically illustrates a partial structure of a thin-film magnetic head as a preferred embodiment according to the present invention by a cross section of a plane passing through a track center of the magnetic head, and FIG. 3 schematically illustrates a partial shape of the coil conductor shown in FIG. 2. The thin-film magnetic head in this embodiment is a recording head with an inductive transducer element only. However, the present invention can be of course adapted to a composite type thin-film magnetic head with both inductive recording element and a magnetoresistive effect (MR) reproducing element which are integrated together.

In FIG. 2, reference numeral 20 denotes a substrate, 21 an insulation layer deposited on the substrate 20, 22 a lower magnetic pole layer formed on the insulation layer 21, 23 a recording gap layer made of insulation material, 24 an upper magnetic pole layer, 25 a coil conductor, 26 an insulation layer surrounding the coil conductor 25, and 27 a protection layer, respectively. The coil conductor 25 may be formed in two-layered structure as shown in FIG. 2, in three-layered structure or in a single layer structure.

The coil conductor 25 is shaped, as shown in FIG. 3, so that its both side faces have many grooves 25a with many projections and depressions along its axis, namely along the direction of write current flowing I. Each of the grooves 25a has a pitch of about 0.05–0.2 $\mu$m, and a depth of about 0.01–0.1 $\mu$m.

By forming such many grooves 25a on the surface of the coil conductor 25, a surface area of the conductor extremely increases without varying coil width or coil pitch. Thus, increasing in resistance due to the skin effect can be suppressed even if the write current frequency more heightens. As a result, the magnetic head can be prevented from heating and high power consumption. In addition, thanks to very low resistance value of the coil conductor 25, design and fabrication of a head amplifier become very easy.

FIGS. 4a to 4g illustrate manufacturing processes using a frame plating method, of the coil conductor 25 in the embodiment shown in FIG. 2. These figures are shown by a cross section of a plane passing through a track center of the magnetic head.

Figure 4A:
FIGS. 4a to 4g illustrate manufacturing processes of the coil conductor in the embodiment shown in FIG. 2.
Figure 4B:

On the insulation layer 26 shown in FIG. 4a, a low resistance layer 40 made of preferably material of the same component as that of the coil conductor 25 to be plated such as Cu is deposited in a thickness of about 10–500 nm, as shown in FIG. 4b.

Figure 4C:
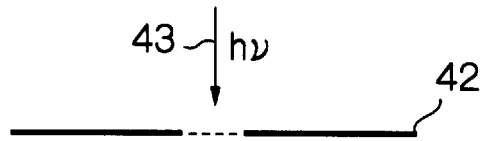
Figure 4D:
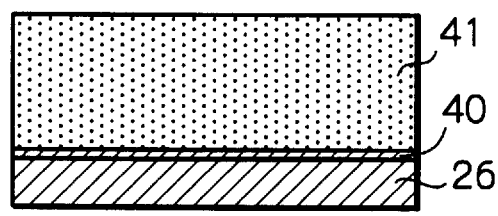
Figure 4D:
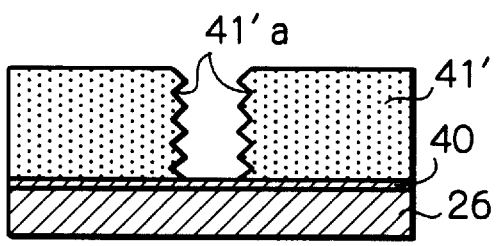

Then, as shown in FIG. 4c, a resist layer 41 is coated on the low resistance layer 40. The resist layer 41 should be formed to have a thickness lager than that of a layer to be plated. Then, a predetermined pattern of a mask 42 is transferred to the resist layer 41 by an exposure process of a monochromatic light 43 of Hg-i line for example, and developed without performing a post exposure baking (PEB) process. Because of monochromatic light exposure, interference between the incident light and the reflected light from the bottom of the resist layer 41 (top surface of the low resistance layer 40) will be occur causing a standing wave at exposed pattern portions of the resist layer 41 (inner walls of resist trenches) to generate. Thus, as shown in FIG. 4d, the inner wall of each resist trench of the resist layer 41' have many grooves 41'a a with many projections and depressions. In the conventional processes, such grooves were removed to make the inner walls of the resist trench smooth by the PEB process. However, according to the present invention, the exposed resist layer 41' is developed without executing the PEB process to remain the many grooves 41'a.

Figure 4E:
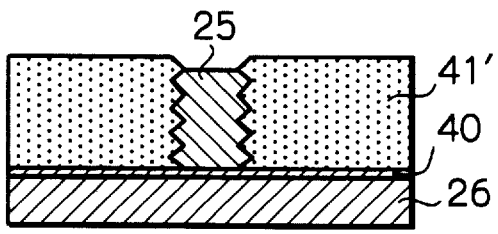

Thereafter, as shown in FIG. 4e, conductive material such as Cu is plated to fabricate the coil conductor 25 by using thus patterned resist frame 41' as a mold. Thus, the many projections and depressions or the many grooves 41'a formed on the inner walls of the resist trench of the resist layer 41' are transferred on the side faces of the coil conductor 25. By appropriately selecting the wave length of the exposure light, resist material and low resistance layer material, each of the grooves 25a will have a pitch of about 0.05–0.2 $\mu$m, and a depth of about 0.01–0.1 $\mu$m.

Figure 4F:
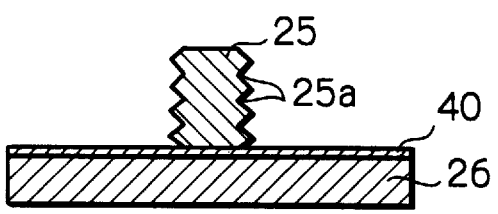

After that, the resist layer 41' is removed by using organic solution for example as shown in FIG. 4f.

Figure 4G:
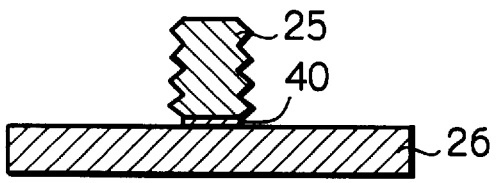

Then, as shown in FIG. 4g, the low resistance layer 40 except for regions which are covered by thus formed coil conductor 25 is removed by a dry etching such as ion milling or RIE (reactive ion etching) or by an wet etching.

As will be understood from the above-description, according to the present invention, the resist layer 41 is exposed by the monochrome light and then developed without performing the PEB. Thus, many grooves 41'a a with many projections and depressions are formed on the inner walls of the resist frame 41'. Then, by executing the frame plating using the resist frame 41', the coil conductor 25 is formed with both side faces having the many grooves 25a with many projections and depressions along its axis. Since no PEB process is needed, a more simple manufacturing process can provide a coil conductor with a lower resistance.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head including a thin-film magnetic circuit which contains a coil conductor with at least one surface, said coil conductor comprising a plurality of grooves for reducing electrical resistance of said coil conductor due to skin effect, said grooves being formed on the at least one surface of said coil conductor to run along a longitudinal axis of said coil conductor.

2. The thin-film magnetic head as claimed in claim 1, wherein said coil conductor has side faces, and wherein said plurality of grooves for reducing electrical resistance due to the skin effect are formed on said side faces.

3. The thin-film magnetic head as claimed in claim 1, wherein said plurality of grooves for reducing electrical resistance due to the skin effect are many grooves with many projections and depressions.

4. The thin-film magnetic head as claimed in claim 1, wherein said plurality of grooves for reducing electrical resistance due to the skin effect have pitches of about 0.05–0.2 $\mu$m.

5. The thin-film magnetic head as claimed in claim 1, wherein said plurality of grooves for reducing electrical resistance due to the skin effect have a depth of about 0.01–0.1 $\mu$m.

* * * * *